United States Patent
Lang et al.

(10) Patent No.: US 10,337,479 B2
(45) Date of Patent: Jul. 2, 2019

(54) HOLDER FOR FASTENING A COMPONENT TO AN INTERNAL COMBUSTION ENGINE

(71) Applicant: Robert Bosch GmbH, Stuttgart (DE)

(72) Inventors: Klaus Lang, Stuttgart (DE); Thomas Froihofer, Brackenheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 225 days.

(21) Appl. No.: 15/021,224

(22) PCT Filed: Sep. 2, 2014

(86) PCT No.: PCT/EP2014/068590
§ 371 (c)(1),
(2) Date: Mar. 10, 2016

(87) PCT Pub. No.: WO2015/049082
PCT Pub. Date: Apr. 9, 2015

(65) Prior Publication Data
US 2016/0222935 A1 Aug. 4, 2016

Related U.S. Application Data

(63) Continuation of application No. PCT/EP2014/068590, filed on Sep. 2, 2014.

(30) Foreign Application Priority Data

Oct. 1, 2013 (DE) .......... 10 2013 219 892

(51) Int. Cl.
*F16L 3/223* (2006.01)
*F02M 61/14* (2006.01)
(Continued)

(52) U.S. Cl.
CPC ........ *F02M 61/14* (2013.01); *F02M 63/0225* (2013.01); *F02M 69/465* (2013.01);
(Continued)

(58) Field of Classification Search
CPC ........ F02M 2200/857; F16L 3/12; F16L 3/13; F16L 21/08; F16L 15/002; F16L 23/0283;
(Continued)

(56) References Cited

U.S. PATENT DOCUMENTS 892,105 A * 6/1908 White ............... F16L 3/202
122/510
3,783,842 A * 1/1974 Kuhn ............... F02M 55/00
123/195 C
(Continued)

FOREIGN PATENT DOCUMENTS

CH 708163 A2 * 12/2014 ............ F16L 33/04
DE 19536316 9/1996
(Continued)

OTHER PUBLICATIONS

International Search Report for PCT/EP2014/068590, dated Oct. 30, 2014.

*Primary Examiner* — Marguerite J McMahon
*Assistant Examiner* — Teuta B Holbrook
(74) *Attorney, Agent, or Firm* — Norton Rose Fulbright US LLP; Gerard Messina

(57) ABSTRACT

A holder is used for fastening a component, in particular a fuel distributor, to an internal combustion engine. The holder has at least one connection element, which includes a locating area. In the installed state, in which the connection element rests against an outer side of the component via its locating area, the locating area of the connection element extends across an angle greater than 180 degrees in relation to a longitudinal axis of the component. Furthermore, in the
(Continued)

installed state, in which the connection element is resting via its locating area against the outer side of the component, the locating area has the form of a cylinder jacket. In addition, a system having a component and such a holder is provided.

13 Claims, 5 Drawing Sheets

(51) Int. Cl.
  *F02M 69/46* (2006.01)
  *F16L 3/13* (2006.01)
  *F02M 63/02* (2006.01)
  *F16L 3/12* (2006.01)

(52) U.S. Cl.
  CPC .................. *F16L 3/12* (2013.01); *F16L 3/13* (2013.01); *F02M 2200/857* (2013.01)

(58) Field of Classification Search
  CPC ......... F16L 23/08; F16L 23/18; F16L 25/065; F16L 27/053; F16L 37/086; F16L 37/092; F16L 37/133; F16L 37/138; F16L 37/14; F16L 3/1066; F16L 55/1705
  USPC ......... 248/65, 67.7, 68.1, 70, 73, 74.1, 74.2, 248/74.3; 403/222, 223, 247–250
  See application file for complete search history.

(56) References Cited

U.S. PATENT DOCUMENTS

| | | | | |
|---|---|---|---|---|
| 4,367,857 A * | 1/1983 | McCarthy | ................ | F16L 3/00 248/74.1 |
| 4,730,800 A * | 3/1988 | Engman | ................ | E21F 17/02 248/316.5 |
| D306,417 S * | 3/1990 | Godbersen | ................ | D12/106 |
| 5,121,894 A | 6/1992 | Twork, Sr. et al. | | |
| 5,222,771 A * | 6/1993 | Imura | ................ | F16L 41/084 285/189 |
| 5,240,068 A * | 8/1993 | Tokutake | ................ | B60K 11/04 165/153 |
| 5,624,089 A * | 4/1997 | Nadherny | ................ | B60T 17/046 248/62 |
| 5,697,585 A * | 12/1997 | Hungerford, Jr. | ................ | F16L 3/08 248/74.3 |
| 5,775,652 A * | 7/1998 | Crawshaw | ................ | F21V 21/088 248/230.6 |
| 5,794,896 A * | 8/1998 | Hungerford, Jr. | ................ | F16L 3/12 248/74.3 |
| 6,059,241 A * | 5/2000 | Martone | ................ | F16B 2/10 24/16 PB |
| RE36,768 E | 7/2000 | Lear et al. | | |
| 6,302,088 B1 * | 10/2001 | Kato | ................ | F02M 35/167 123/468 |
| 6,481,673 B1 * | 11/2002 | Roe | ................ | B60K 13/04 248/300 |
| 6,523,790 B2 * | 2/2003 | Sentpali | ................ | F16B 2/12 248/68.1 |
| 6,802,539 B2 * | 10/2004 | Cooke | ................ | F02M 55/02 123/468 |
| D538,634 S * | 3/2007 | King | ................ | D8/380 |
| 7,353,732 B2 * | 4/2008 | Renshaw | ................ | B62K 21/12 74/551.8 |
| 7,406,946 B1 | 8/2008 | Watanabe et al. | | |
| 2003/0164157 A1 | 9/2003 | Bodenhausen | | |
| 2004/0183294 A1 * | 9/2004 | Elliott | ................ | B25B 1/205 285/15 |
| 2005/0098697 A1 * | 5/2005 | Collins | ................ | F16L 3/13 248/231.71 |
| 2005/0139732 A1 * | 6/2005 | Kato | ................ | B60R 16/0207 248/71 |
| 2007/0051106 A1 * | 3/2007 | Jones | ................ | F02B 37/186 60/602 |
| 2007/0205193 A1 * | 9/2007 | Whipple | ................ | B60K 15/04 220/86.1 |
| 2009/0146021 A1 * | 6/2009 | Becker | ................ | F16L 3/02 248/68.1 |
| 2009/0265895 A1 * | 10/2009 | Box | ................ | F16L 3/12 24/20 R |
| 2010/0098206 A1 * | 4/2010 | Baversten | ................ | G21C 15/25 376/289 |
| 2010/0275883 A1 | 11/2010 | Hohkita et al. | | |
| 2013/0043368 A1 * | 2/2013 | Hill | ................ | E04H 17/1421 248/534 |

FOREIGN PATENT DOCUMENTS

| | | |
|---|---|---|
| DE | 60313240 T2 | 8/2007 |
| EP | 1516115 A1 | 3/2005 |
| EP | 2072806 | 6/2009 |
| GB | 2333324 A | 7/1999 |

* cited by examiner

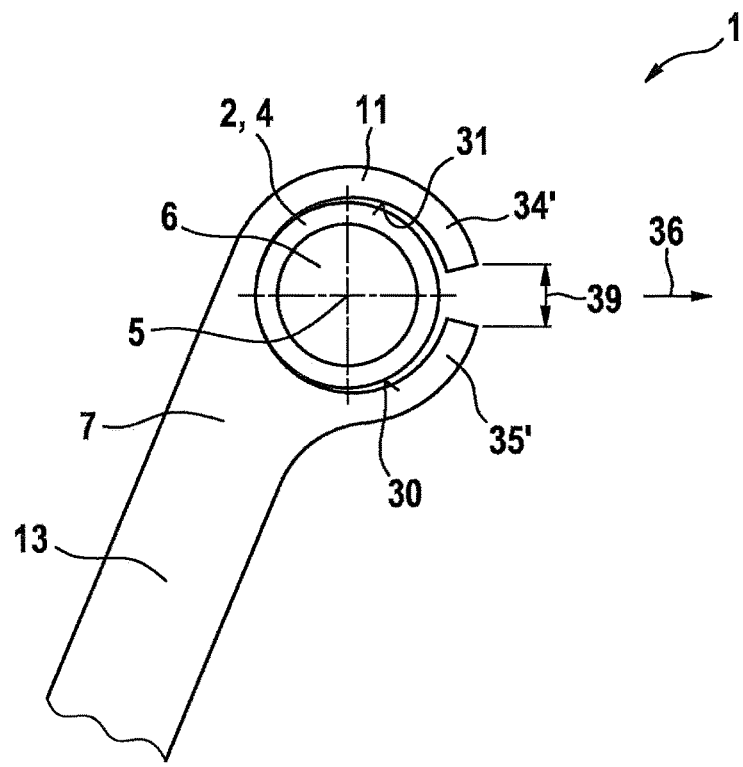
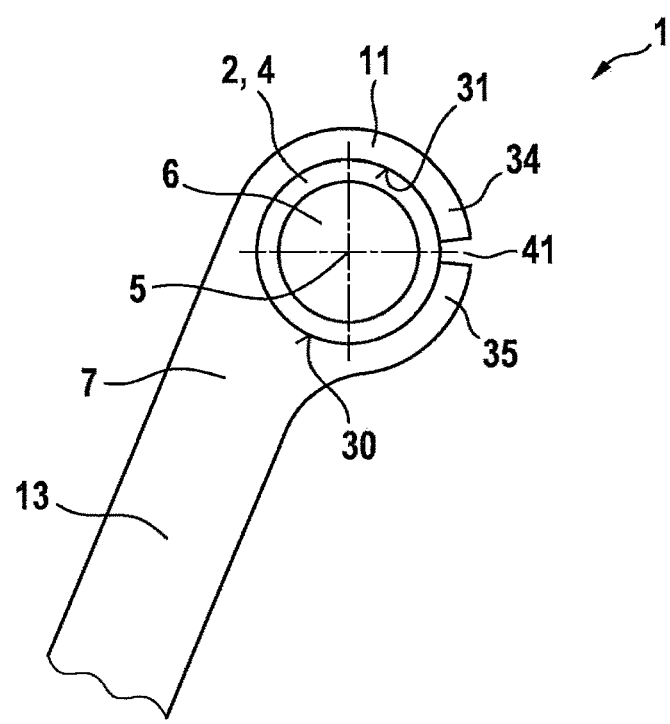

HOLDER FOR FASTENING A COMPONENT TO AN INTERNAL COMBUSTION ENGINE

FIELD

The present invention relates to a holder for fastening a component, in particular a fuel distributor, to an internal combustion engine; it also relates to a system having a component and at least one holder. In particular, the present invention pertains to the field of fuel injection systems of internal combustion engines.

BACKGROUND INFORMATION

A fuel distributor rail, which is mounted on an internal combustion engine via a holder, is described in U.S. Pat. No. 7,406,946 B1. A connection element of the holder is connected via a screw to the internal combustion engine. The connection element of the holder is furthermore connected to a tubular base element of the fuel rail. It is possible that the connection element of the holder is connected to the tubular base element of the fuel rail by a solder connection.

The mounting of the fuel rail on the internal combustion engine described in U.S. Pat. No. 7,406,946 B1 has the disadvantage that tension peaks arise because of notches, in particular at the transition between the connection element of the holder and the tubular base element of the fuel rail. Another disadvantage is that the individual components, especially the connection element of the holder and the tubular base element of the fuel rail, must be radially held in place during the joining process in order to achieve the desired position on the joined component. This is especially critical for permanently connected components, such as components joined by a solder connection, where the gap between the individual components, in particular the tubular base element and the joined element, must be minimal.

Furthermore, it is necessary to produce a geometry at the component(s) to be attached, in particular the connection element, that is nearly identical to the tube geometry of the tubular base element of the fuel rail, which is an involved process. This becomes even more difficult as the enclosure angle of the component(s) to be attached becomes smaller. For example, this may require a detection of the particular diameter segment with the aid of measuring technology and a comparison with the required drawing information.

Another disadvantage may result with regard to a pre-joining process. Especially in a pre-joining process that is carried out in the form of tacking, especially by welding, for the positioning prior to a subsequent soldering process for the final connection, the welding connection frequently breaks before the final fixation, which consequently results in scrapped pieces. In addition, tacking points may weaken the tubular base element and the attachment part(s).

If the attachment part(s) is/are developed as formed parts, they typically exhibit residual stresses due to the high degree of reforming. These residual stresses may also be unleashed by subsequent manufacturing processes, such as a heat treatment during the soldering process, which has a considerable adverse effect on the dimensional accuracy of the finished components.

Because of the specifications, in particular the connection to the tubular base element, the space and the connection geometry, as well as the contour resulting therefrom, the typically reformed attachment parts furthermore have geometrically disadvantageous regions, such as notches, which lead to stress characteristics that feature stress peaks.

Furthermore, the typically radial connection requires a large solder surface since it is stressed with regard to pealing. This results in poor controllability of the soldering process. In addition, the risk of flaws in the soldering surface grows as the contact area becomes larger. A lot of solder is required for large soldering surfaces, which is also disadvantageous from the financial standpoint.

Moreover, long bent parts are typically flexible in at least one loading direction. This results in low natural frequencies and high stressing.

SUMMARY

The example holder according to the present invention, and the example system of the present invention may have the advantage of allowing a better development of the connection. In particular, a notching effect and thus abrupt changes in the stress characteristic is/are able to be reduced, and a cost-effective development and manufacture are ensured at the same time.

The holder is used for fastening the component to an internal combustion engine. The component is not part of the holder according to the present invention. The holder allows the component to be fixed in place on a cylinder head of the internal combustion engine, in particular. An indirect fixation on a suitable attachment structure connected to the internal combustion engine is possible as well. The system having the component and the at least one holder in particular may be developed as a fuel injection system or as part of a fuel injection system. If the system has multiple holders, then they preferably have a mutually corresponding design.

It is advantageous that the angle across which the locating area of the connection element extends with respect to the longitudinal axis of the component in the installed state equals 360 degrees. The longitudinal axis of the component in particular may be the longitudinal axis of a tubular base element of the component. In this development the connection element can have an annular design in the region of its locating area. The connection element then encloses the component by 360 degrees, so that the connection element circumferentially encloses the component on its outer side by its locating area in the installed state. In one modified development, the angle across which the locating area of the connection elements extends with respect to the longitudinal axis of the component in the installed state may also be less than 360 degrees. Especially a connection element that is open at one point with regard to the enclosure of the component may thereby be realized. This facilitates the installation of the connection element on the component, and tolerances can be compensated or larger tolerances be permitted.

It may also be advantageous if the connection element has at least one connection arm which, in the installed state when in contact with the outer side of the component, is bent around the outer side of the component. A further connection arm is preferably provided on the connection element, which when installed and in contact with the outer side of the component, is bent around the outer side of the component in the opposite direction of the connection arm. Depending on the development, the connection arms may be developed as bendable connection arms. This makes it possible to initially develop the connection arms in such a way that the connection element with the connection arms is able to be slipped over the tubular base element of the component, for example, in the radial direction with respect to the longitudinal axis of the component. The connection arms may subsequently be bent according to the shape, especially the diameter, of the outer side of the component. In one modified development, however, the connection arms initially may also be bent open only slightly in order to allow an installation along the longitudinal axis by slipping them over. Contact between the connection arms and, for example, the tubular base element is subsequently able to be achieved by bending the connection arms until closed.

It may also be advantageous if a clearance is defined between the connection arm and the further connection arm in the installed state, and that the connection arm and the further connection arm are connected to one another in an intermaterial fashion at the specified distance. For example, the connection arms may be interconnected via a welding seam or at least one welding spot, so that a reliable fixation on the component is possible.

In one modified development, however, it is also possible that a gap is formed between the connection arm and the further connection arm in the installed state. Such a gap may allow the arms to be bent elastically open, so that the connection element can be slipped more easily onto a tubular base element of the component in the lateral direction, for example.

It may be furthermore advantageous if the connection arm and possibly the further connection arm have a flexible design and the holder with its connection element can be connected to the component via a snap-in connection. For example, this makes it possible to slip the connection element over the tubular base element of the component in the radial direction in relation to the longitudinal axis of the component, the at least one connection arm being bent open in the process in order to then enable a snap-in connection on the tubular base element. This, too, makes it possible to realize a reliable connection which is easy to install.

In one further potential development, it may be advantageous if the connection element includes a deformable ring provided with at least one clamping loop. In this way, the opening cross-section of the deformable ring may initially be specified larger than an outer cross-section of the component, in particular a tubular base element of the component, in order to facilitate the assembly. In the positioned state, the clamping loop may be compressed in a suitable manner, so that the opening cross-section of the deformable ring becomes smaller. This allows a fixation of the connection element on the tubular base element of the component, for example.

In the development of the holder it may be furthermore advantageous if a sleeve is provided; if a first fastening area on an outer side of the sleeve is provided; if a fastening section on bottom part of the connection element is connected to the sleeve at the first fastening area of the sleeve; that a second fastening area is provided on the outer side of the sleeve, which points away from the first fastening area; and that a fastening section on a bottom part of a further connection element of the sleeve is connected to the sleeve. The further connection element is preferably developed according to the connection element. It may therefore be possible to achieve a fixation of the components at a certain distance via the two connection element, which improves the stability of the component and thus the fastening of the component to the internal combustion engine.

Depending on the development, one or more of the following advantage(s) may result. The notch effects are able to be reduced, so that abrupt changes in the stress characteristic are decreased. The reduction can be achieved between the connection element developed as an attachment part, and, for example, a main pipe of the component, through a 360 degree enclosure. Furthermore, the reduction in the single-part connection element itself is achievable by a simple implementation of a form and/or contour that are/is optimized with regard to stability.

The connection element may be developed as a sheet metal part that can be slipped on or is slipped on. As a result, it is possible to develop the connection element as a simple part, which reduces the cost.

In addition, tolerances are able to be compensated during the assembly, which lowers the tolerance demands on the individual parts, so that the costs are reduced even further.

Moreover, a supplementary fixation or supplementary fixations able to be developed by a press-fit, for example, may be omitted.

In addition, the solder area may be reduced, which results in better controllability of the soldering process. Furthermore, better checkability of the solder result is achieved through better access, in particular across 360 degrees, and less soldering means lower costs.

In addition, increased component rigidity at relatively large clearances between an axis, in particular a tube axis, of the component and of fastening points on the connection element is able to be obtained. The component rigidity can also be adjusted as desired by installing corresponding supplementary parts. The result is a design that is optimized with regard to cost and robustness. For example, an additional reinforcement between two adjacently disposed connection elements may be added. This results in greatly enhanced component rigidity at little extra expense.

In addition, the influence of the intrinsic stress in subsequent processes can be reduced considerably, which makes it possible to increase the quality of the subassembly.

BRIEF DESCRIPTION OF THE DRAWINGS

Preferred exemplary embodiments of the present invention are explained in greater detail below with reference to the figures, where corresponding elements have been provided with matching reference numerals.

FIG. 5 shows a system having a component and a holder in an excerpted schematic sectional view according to a fourth exemplary embodiment of the present invention during an installation.

FIG. 6 shows the system shown in FIG. 5 according to the fourth exemplary embodiment of the present invention in an installed state.

DETAILED DESCRIPTION OF EXAMPLE EMBODIMENTS

Figure 1:
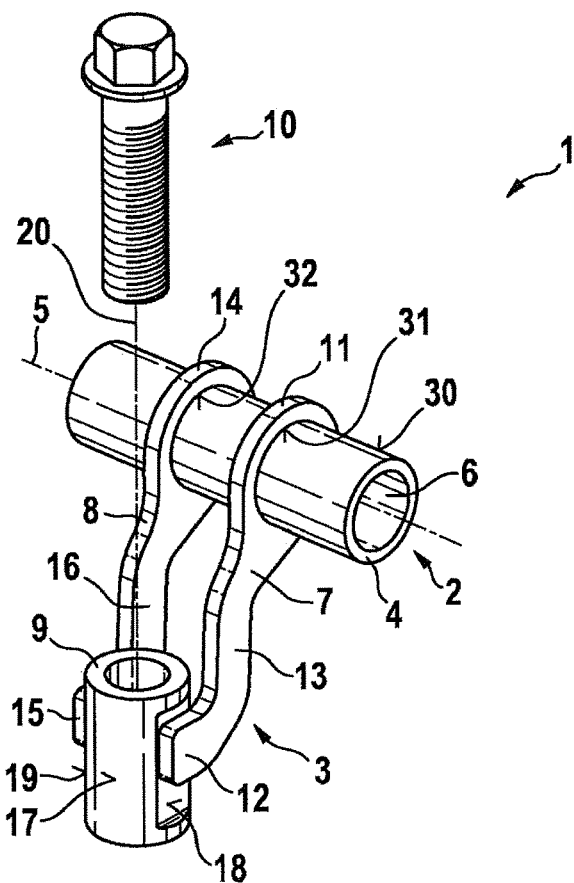
FIG. 1 shows a system having a component and a holder in an excerpted schematic three-dimensional view according to a first exemplary embodiment of the present invention.

FIG. 1 shows a system 1 having a component 2 and a holder 3 in an excerpted schematic three-dimensional view according to a first exemplary embodiment. Shown here is a section of a tubular base element 4 of component 2, which extends along a longitudinal axis 5. An interior space 6 is developed within tubular base element 4, which functions as fuel space 6. During an operation fuel can be conveyed via interior space 6. For example, multiple outputs, especially cups, may be provided on tubular base element 4, via which fuel injectors are able to be supplied with fuel. Component 2 is developed as a fuel distributor in such a case. Holder 3 will then be used for fastening fuel distributor 2 to an internal combustion engine. However, holder 3 may also be used for fixating other components 2 on an internal combustion engine.

One or more further holder(s) is/are preferably provided, which may be developed similar to holder 3. This makes it possible to fasten component 2 via holder 3 and possibly further holders to the internal combustion engine. In particular, an attachment to a cylinder head of an internal combustion engine is possible in this way, but an indirect affixation in which holder 3 is installed on an attachment structure connected to the internal combustion engine is possible as well.

Holder 3 has a connection element 7, a further connection element 8, a sleeve 9, and possibly additional components, such as a fastener 10 developed as a fastening screw 10. Via fastener 10, sleeve 9 can be screw-fitted to a cylinder head of an internal combustion engine, for example.

Connection element 7 has a head part 11, a bottom part 12, and a segment 13, which forms a center part 13 that connects head part 11 to bottom part 12. Accordingly, further connection element 8 has a head part 14, a bottom part 15, and a segment 16 that forms a center part 16 which connects head part 14 to bottom part 15.

Sleeve 9 has a cylindrical jacket outer side 17, but a flat first fastening area 18 and a flat second fastening area 19 are developed on outer side 17. In this exemplary embodiment, fastening areas 18, 19 extend along a fastening axis 20 of sleeve 9 to such an extent that the position of bottom parts 12, 15 in fastening areas 18, 19 is able to be varied or adjusted along fastening axis 20 prior to connecting connection elements 7, 8 to sleeve 9. As a result, bottom parts 12, 15 of connection elements 7, 8 can be positioned at a suitable height in relation to fastening axis 20 on sleeve 9 prior to such a connection. A connection of bottom parts 12, 15 on the respective fastening area 18, 19 is then possible by an intermaterial connection, such as welding or soldering. An adaptation to the particular application case, and/or a tolerance compensation are/is achievable in the process.

Fastener 10 may then be guided through sleeve 9 along fastening axis 20 during the further installation.

First fastening area 18 and second fastening area 19 are developed on sleeve 9 so as to point away from each other. Fastening area 18, 19 on sleeve 9 are preferably developed in parallel with each other.

Tubular base element 4 of component 2 has an outer side 30, which is developed in the form of a cylinder jacket, at least in the region of head part 11 of connection element 7 and in the region of head part 14 of further connection element 8. In this exemplary embodiment, outer side 30 of tubular base element 4 is developed in the form of a cylinder jacket overall. As shown correspondingly in FIG. 3, for example, an inward lying locating area 31 is developed on head part 11 of connection element 7. Locating area 31 of connection element 7 is designed at least as part of a cylinder jacket surface. In this exemplary embodiment, locating area 31 of connection element 7 is implemented as cylinder-jacket locating area 31. Furthermore, a locating area 32 which is developed to correspond to locating area 31 of connection element 7 is implemented on head part 14 of further connection element 8. In this exemplary embodiment, head parts 11, 14 of connection elements 7, 8 are developed as closed head parts 11, 14. Locating areas 31, 32 of connection elements 7, 8 therefore extend across an angle of 360 degrees in each case.

In the installed state, head parts 11, 14 contact outer side 30 of tubular base element 4 circumferentially in relation to longitudinal axis 5 via their locating areas 31, 32. The angle across which locating areas 31, 32 extend is viewed in relation to longitudinal axis 5 in this case.

In this particular exemplary embodiment, for instance, the assembly may take place in the following manner. It may include the assembly of holder 3 as well as the connection of holder 3 to component 2. For the assembly, tubular base element 4 of component 2 may be positioned with the aid of a suitable device, for instance. In addition, sleeve 9 is able to be positioned relative to tubular base element 4 in such a device. Connection elements 7, 8 may then be slipped onto tubular base element 5 along longitudinal axis 5 from one side or also from both sides. Connection elements 7, 8 may be rotated at their head parts 11, 14 and/or shifted along longitudinal axis 5 in order to align connection elements 7, 8 with regard to a desired position. Connection elements 7, 8 are then positioned as shown in FIG. 1, for example, whereupon the individual parts can be connected to each other in an intermaterial manner. In the process, for example, bottom parts 12, 15 may be soldered to sleeve 9 in fastening areas 18, 19. In addition, head parts 11, 14 can be soldered to tubular base element 4 in their locating areas 31, 32.

In this exemplary embodiment, head parts 11, 14 thus enclose tubular base element 4 by 360 degrees. The enclosure angle is already realized in the finished attachment component, i.e., connection element 7, 8, so that the assembly is implemented by slipping it onto tubular base element 4. Tack points using welding may be provided for the soldering operation as the case may be. However, it may also be possible that a frictional connection is already able to be produced by compression, which allows a preliminary fixation of connection elements 7, 8 on tubular base element 4, in which case such tack points may be omitted.

In this exemplary embodiment, locating areas 31, 32 by which connection elements 7, 8 are resting against outer side 30 of tubular base element 4, are developed in the form of a cylinder jacket. In one modified development, locating areas 31, 32 of head parts 11, 14 of connection elements 7, 8 may also have a different design, in particular one that has a polygon contour. Outer side 30 of tubular base element 4 then is modified accordingly, in particular given a polygon contour. This ensures that connection elements 7, 8 are also resting against outer side 30 of tubular base element 4 via their locating areas 31, 32, which is the case across the angle of 360 degrees in this exemplary embodiment. In particular, locating areas 31, 32 of connection elements 7, 8 thus extend across an angle that is greater than 180 degrees in relation to longitudinal axis 5 of component 2 in the installed state, when connection elements 7, 8 are resting against outer side 30 of component 2 via their locating areas 31, 32.

Furthermore, with the aid of further or other simple components, in particular a sleeve 9 having a round cross-section, a sleeve 9 having a square cross-section, a round sleeve 9 that fits into the opening of a wrench or the like, tight tolerances can be maintained during the assembly process while installing the component, despite the fact that the individual parts may have relatively large tolerances.

Figure 2:
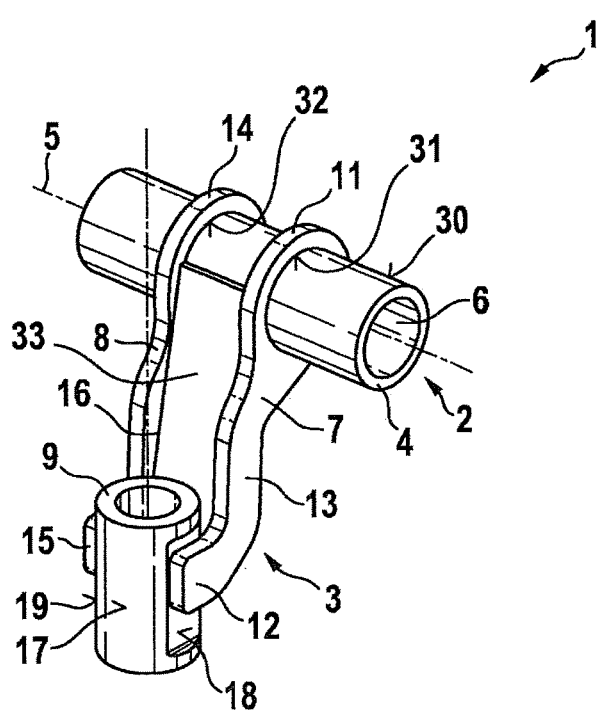
FIG. 2 shows a system having a component and a holder in an excerpted schematic three-dimensional view according to a second exemplary embodiment of the present invention.

FIG. 2 shows a system having a component 2 and a holder 3 in an excerpted, schematic three-dimensional view that corresponds to a second exemplary embodiment. In this exemplary embodiment, an additional reinforcement 33 is provided, which is created by a reinforcement element 33 in this case. Reinforcement element 33 is situated between the two connection elements 7, 8 and extends from sleeve 9 to tubular base element 4; it is connected to connection elements 7, 8 and/or sleeve 9, and/or tubular base element 4 in a suitable manner.

As a result, it is possible to realize greater component rigidity with a relatively large clearance between longitudinal axis 5 and the fastening point on the internal combustion engine. The component rigidity is adjustable as desired within certain limits, which is made possible by installing at least one reinforcement element 33. This results in a development that is optimized with regard to cost and stability.

Figure 3:
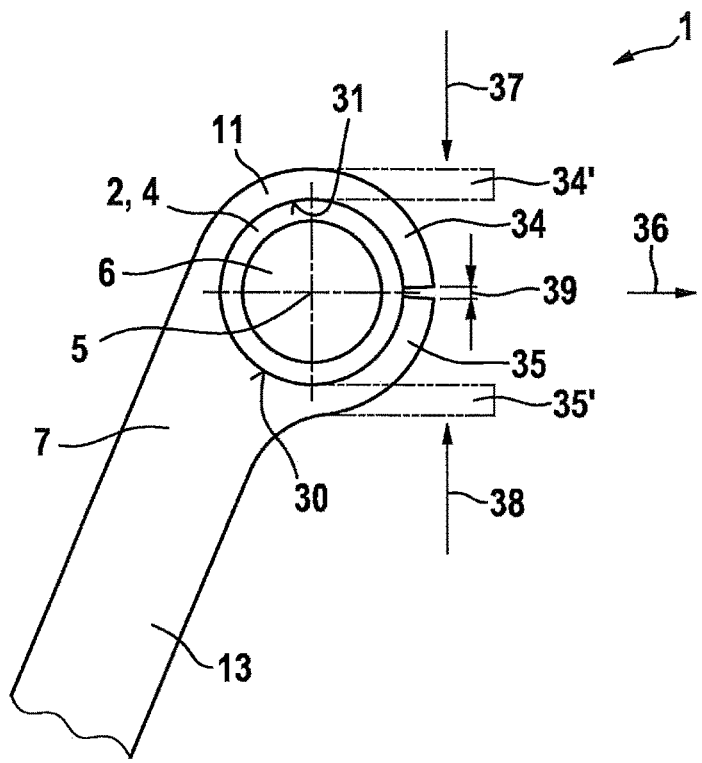
FIG. 3 shows a system having a component and a holder in an excerpted schematic three-dimensional view according to a third exemplary embodiment of the present invention during an assembly.

FIG. 3 shows a system 1 having a component 2 and a holder 3 in an excerpted, schematic three-dimensional sectional view which corresponds to a third exemplary embodiment during an assembly. Head part 11 of connection element 7 has a connection arm 34' and a further connection arm 35', connection arms 34', 35' initially being oriented in parallel with one another during the assembly. Head part 11 having connection arms 34, 35 therefore is open at the start of the assembly. Open head part 11 may thus be fitted on tubular base element 4 in a radial direction 36 that has a radial orientation in relation to longitudinal axis 5. Connection arms 34', 35' are then bent around outer side 30 of component 2 during the further assembly steps, as illustrated by arrows 37, 38. In this exemplary embodiment, arrows 37, 38 are pointing toward each other, so that connection arms 34', 35' are bent toward each other. Producing the enclosure thus takes place during the further assembly process by additional joining, pressing, reshaping or the like. This closes head part 11. Closed head part 11 then has bent connection arms 34, 35.

In this exemplary embodiment, the bending of connection arms 34', 35' results in an enclosure of tubular base element 4 by nearly 360 degrees. Bent connection arms 34, 35 then rest against outer side 30 of component 2.

A clearance 39 may be created or specified between connection arms 34, 35. Such a clearance 39 is specified as a minimum in this exemplary embodiment, which makes it possible to produce an enclosure of virtually 360 degrees.

Figure 4:
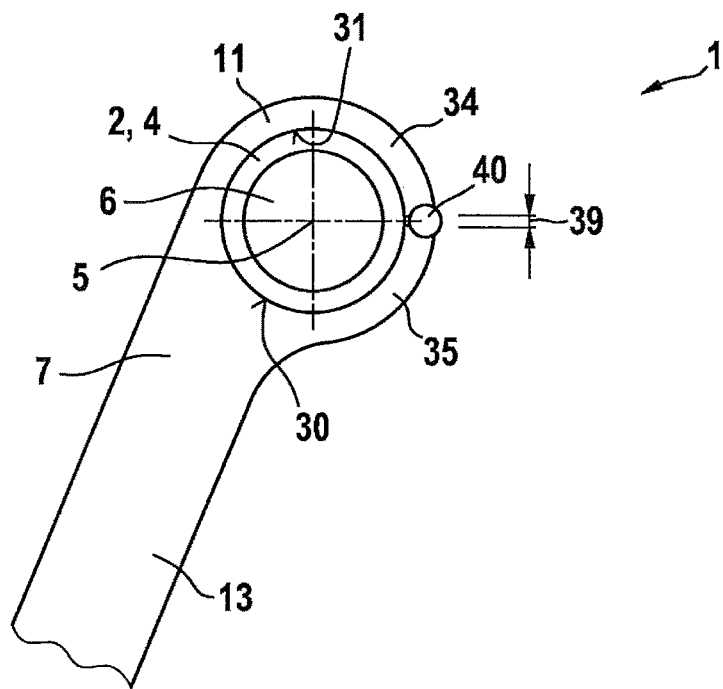
FIG. 4 shows the system shown in FIG. 3, according to the third exemplary embodiment of the present invention in an installed state.

FIG. 4 shows system 1 illustrated in FIG. 3 according to the third exemplary embodiment in an assembled state. In the final state of assembly, in which the diameter of head part 11 is closed, bent connection arms 34, 35 are able to be fixated in their position. For example, this may be accomplished by a welding spot 40, which connects connection arms 34, 35 at their ends to one another. Connection arms 34, 35 are integrally joined to one another at predefined clearance 39.

FIG. 5 shows a system having a component 2 and a holder 3 in an excerpted, schematic sectional view that corresponds to a fourth exemplary embodiment during an assembly. In this exemplary embodiment, a sufficiently large clearance 39 is initially specified between connection arms 34', 35', which allows an easier installation of connection element 7 on tubular base element 4. To do so, connection element 7 is slipped over tubular base element 4 along longitudinal axis 5 of tubular base element 4. Installation play is specified between locating area 31 of head part 11 and outer side 30 of tubular base element 4. When connection element 7 then is positioned on tubular base element 4, the diameter is closed.

In one modified development, in which connection arms 34', 35' are created from an appropriately suitable material, head part 11 is also able to be fitted on tubular base element 4 in radial direction 36 in that connection arms 34', 35' are bent open. Connection arms 34, 35 are then compressed.

FIG. 6 shows system 1 shown in FIG. 5 corresponding to the fourth exemplary embodiment in an installed state. Once connection arms 34, 35 are bent into their final position, a gap 41 remains between connection arms 34, 35 in this exemplary embodiment. This gap creates a certain interspace 41 so that the enclosure is less than 360 degrees in the installed state. Gap 41 preferably is dimensioned such that the enclosure is no greater than 350 degrees in the installed state. Locating area 31 of head part 11 then extends across an angle that is greater than 180 degrees and does not exceed 350 degrees in relation to longitudinal axis 5 in the installed state.

The position of connection arms 34, 35 with a closed diameter is able to be fixed in place by one or more welding spots or also in some other manner.

Figure 7:
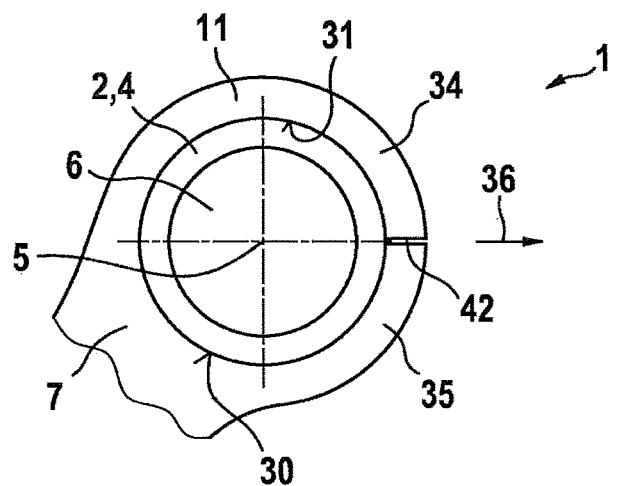
FIG. 7 shows a system having a component and a holder, in an excerpted schematic sectional view according to a fifth exemplary embodiment of the present invention.

FIG. 7 shows a system 1 having a component 2 and a holder 3 in an excerpted, schematic sectional view which corresponds to a fifth exemplary embodiment. Connection element 7, for example, may be produced by stamping. To create connection element 7 according to the fifth exemplary embodiment, head part 11 may be produced in the stamping process in the peripherally closed state to begin with, locating area 31 being produced by stamping a full circle out of head part 11. A slot may then be cut into the closed ring of head part 11, so that a slot 42 is created. Slot 42 allows a certain distension along longitudinal axis 5 in an axial installation of connection element 7, so that the assembly becomes easier. Radial joining of slotted head part 11 on tubular base element 4 in a radial direction 36 is possible as well when connection arms 34, 35 of head part 11 are suitably bent open for this purpose.

Slot 42 allows an uncomplicated insertion or displacement for the positioning during the installation since it makes it possible to realize a loose fit. This also allows greater tolerances of tubular base element 4, in particular with regard to an outer diameter on outer side 30 of tubular base element 4.

The enclosure of virtually 360 degrees is produced by additional pressing and fixating, in particular tacking, during the further installation process. Play between head part 11 of connection element 7 and tubular base element 4 of component 2 is thereby reduced to a minimum, which also improves the quality of the soldering.

In this development, the remaining front-side gap 42 of connection element 7 formed by slot 42 is minimal because gap 42 is due only to the required separating slot of annular head part 11.

Figure 8:
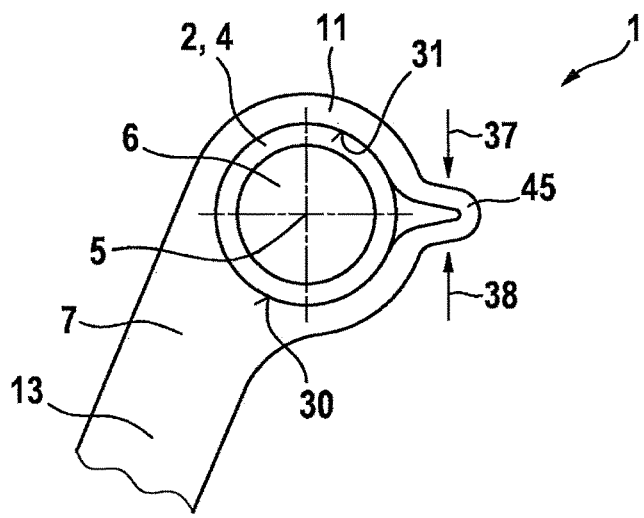
FIG. 8 shows a system having a component and a holder in an excerpted schematic sectional view according to a sixth exemplary embodiment of the present invention during an installation.

FIG. 8 shows a system 1 having a component 2 and a holder 3 in an excerpted, schematic sectional view corresponding to a sixth exemplary embodiment during an installation. In this exemplary embodiment, head part 11 is developed as a closed ring having a clamping loop 45. A certain amount of play may be specified here in order to make it easier to slide head part 11 of connection element 7 onto tubular base element 4. After connection element 7 has been slipped on and positioned, a suitable tool may be used for compressing clamping loop 45 from directions 37, 38. The compression results in a minimum gap between tubular base element 4 and locating area 31 of head part 11. This produces an excellent soldering quality. The compression of clamping loop 45 may be achieved by pushing or pressing.

Figure 9:
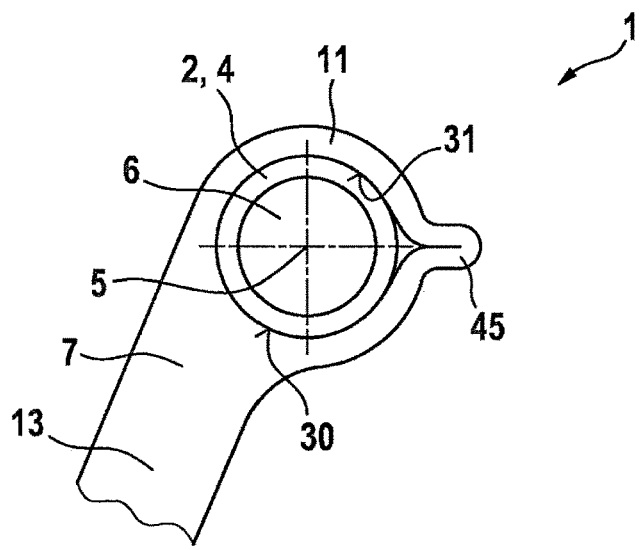
FIG. 9 shows the system shown in FIG. 8 according to the sixth exemplary embodiment of the present invention in an installed state.

FIG. 9 shows system 1 illustrated in FIG. 8 according to the sixth exemplary embodiment in an installed state. Clamping loop 45 has been compressed. Head part 11 developed as a deformable ring 11 is thereby resting at least largely against outer side 30 of tubular base element 4 of component 2 via its locating area 31.

Figure 10:
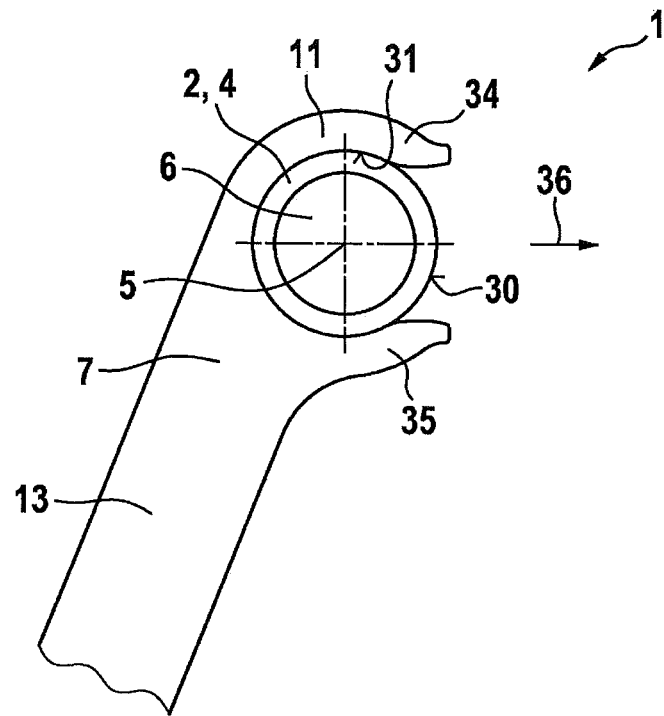
FIG. 10 shows a system having a component and a holder in an excerpted schematic sectional view according to a seventh exemplary embodiment of the present invention.

FIG. 10 shows a system 1 having a component 2 and a holder 3 in an excerpted, schematic sectional view corresponding to a seventh exemplary embodiment. In this exemplary embodiment, head part 11 of connection element 7 is at least approximately developed in the shape of a fork. However, locating area 31 extends across an angle of more than 180 degrees in relation to longitudinal axis 5. Connection arms 34, 35 are developed and at least one of connection arms 34, 35 has a flexible design. This allows a radial installation of connection element 7 with its head part 11 on tubular base element 4 in radial direction 36. During the installation, connection arms 34, 35 bend open elastically, so that fork-shaped head part 11 is snapped or clipped into place on tubular base element 4. A certain pretension in the installed state is also able to be ensured in this manner, so that a preliminary fixation such as tacking may possibly be omitted as a result.

Figure 11:
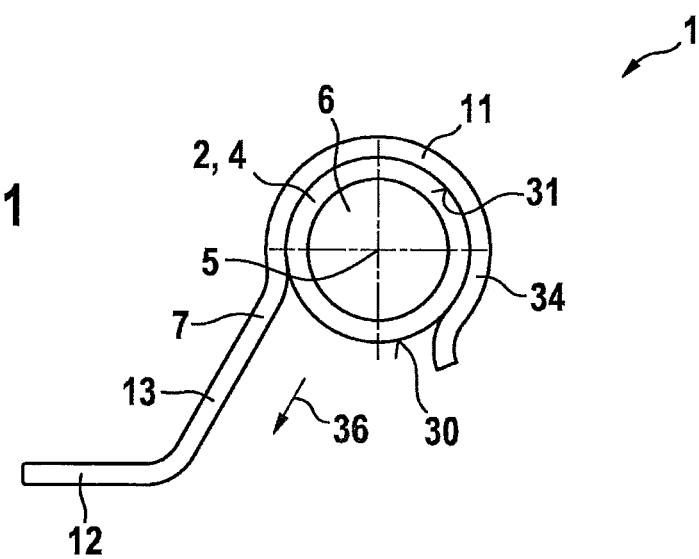
FIG. 11 shows a system having a component and a holder in an excerpted schematic sectional view according to an eighth exemplary embodiment of the present invention.

FIG. 11 shows a system 1 having a component 2 and a holder 3 in an excerpted, schematic sectional view corresponding to an eighth exemplary embodiment. In this exemplary embodiment, head part 11 has a connection arm 34 which has an elastic design. Via its locating area 31, head part 11 encloses tubular base element 4 across an angle of more than 180 degrees in the installed state. For the assembly, connection element 7 can be joined via its head part 11 to tubular base element 4 in radial direction 36. This makes it possible to clip connection element 7 with its open head part 11 to tubular base element 4. Connection arm 34 snaps into place on tubular base element 4 in so doing. Base part 12 of connection element 7 may be suitably oriented here. In particular, base part 12 may have a flat orientation, as shown in FIG. 11, or it may be upright.

As a result, different developments are possible, in which head part 11 of connection element 7 encloses tubular base element 4 at an angle of more than 180 degrees with its locating area 31 in the installed state. Here, such an angle may be specified as less than 360 degrees or also as equal to 360 degrees. In addition, the enclosure angle on tubular base element 4 may also be realized only during the installation process, in particular by a clip-on operation or plastic shaping, which may occur in the context of the radial joining of the individual parts.

The present invention is not restricted to the exemplary embodiments described.

What is claimed is:

1. A holder for fastening a component to an internal combustion engine, comprising:
   a connection element having a locating area (a) that is configured to extend across an angle greater than 180 degrees in relation to a longitudinal axis of the component in the installed state and (b) via which the connection element rests against an outer side of the component in the installed state; and
   a sleeve, an outer surface of which includes, at respective opposite sides of the sleeve, a first fastening area and a second fastening area, wherein:
      each of the fastening areas is a respective groove in a curved surface of the sleeve;
      a longitudinal extension of each of the grooves is parallel to a central longitudinal axis of the sleeve;
      each of the grooves forms a respective flat surface;
      a base part of a first arm of the connection element is connected to the sleeve at the first fastening area of the sleeve; and
      a base part of a second arm of the connection element is connected to the sleeve at the second fastening area of the sleeve.

2. The holder as recited in claim 1, wherein the component is a fuel distributor.

3. The holder as recited in claim 1, wherein the connection element is configured so that, in the installed state, the locating area is at least a part of a cylindrical jacket surface or has a polygonal contour.

4. The holder as recited in claim 1, wherein the connection element has at least one holding element that, in the installed state, is bent around the outer side of the component and makes contact with the outer side of the component.

5. The holder as recited in claim 4, wherein the at least one holding element is flexible and is able to be connected to the component by a snap-in connection.

6. The holder as recited in claim 1, wherein the connection element has first and second holding elements that, in the installed state, each is bent around the outer side of the component and makes contact with the outer side of the component.

7. The holder as recited in claim 6, wherein the first and second holding elements are connected to each other in an integral fashion at with a welding seam or spot at an angular position about the longitudinal axis of the component.

8. The holder as recited in claim 6, wherein there is a gap or slot between the first and second holding elements, in a circumferential direction relative to the longitudinal axis of the component.

9. The holder as recited in claim 1, wherein the connection element has a deformable, annular head part which includes at least one clamping loop.

10. The holder as recited in claim 1, further comprising a reinforcing bar extending between the first and second arms and opposite edges of which are connected to the first and second arms.

11. The holder as recited in claim 1, wherein the connection element is configured so that the angle across which the locating area of the connection element extends in relation to the longitudinal axis of the component in the installed state is equal to 360 degrees.

12. The holder as recited in claim 1, wherein the connection element is configured so that the angle across which the locating area of the connection element extends in relation to the longitudinal axis of the component in the installed state is less than 360 degrees.

13. A system, comprising:
a fuel distributor including a tubular base element having an outer side; and
a holder that includes:
a connection element having a locating area (a) that extends across an angle greater than 180 degrees in relation to a longitudinal axis of the fuel distributor, thereby enclosing the tubular base element by the angle greater than 180 degrees, and (b) via which the connection element rests against an outer side of the tubular base element of the fuel distributor; and
a sleeve, an outer surface of which includes, at respective opposite sides of the sleeve, a first fastening area and a second fastening area, wherein:
each of the first and second fastening areas is a respective groove in a curved surface of the sleeve;
a longitudinal extension of each of the grooves is parallel to a central longitudinal axis of the sleeve;
each of the grooves forms a respective flat surface;
a base part of a first arm of the connection element is connected to the sleeve at the first fastening area of the sleeve; and
a base part of a second arm of the connection element is connected to the sleeve at the second fastening area of the sleeve.

* * * * *